(12) United States Patent
Nakai

(10) Patent No.: US 7,693,367 B2
(45) Date of Patent: Apr. 6, 2010

(54) MULTI-MODE OPTICAL COUPLER

(75) Inventor: Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/273,744

(22) Filed: Nov. 19, 2008

(65) Prior Publication Data

US 2009/0175575 A1  Jul. 9, 2009

(30) Foreign Application Priority Data

Nov. 19, 2007 (JP) .......................... P2007-299600

(51) Int. Cl.
G02B 6/26 (2006.01)
G02B 6/42 (2006.01)

(52) U.S. Cl. ...................................... 385/28

(58) Field of Classification Search .................. 385/27, 385/28, 32, 39, 95
See application file for complete search history.

(56) References Cited

U.S. PATENT DOCUMENTS

| 4,493,528 | A | * | 1/1985 | Shaw et al. | ................. 385/30 |
| 4,763,977 | A | * | 8/1988 | Kawasaki et al. | ............. 385/43 |
| 5,048,909 | A | * | 9/1991 | Henry et al. | .................. 385/27 |
| 5,195,151 | A | * | 3/1993 | Campbell et al. | ............. 385/43 |
| 5,570,442 | A | * | 10/1996 | Arii et al. | ..................... 385/46 |
| 7,046,890 | B2 | * | 5/2006 | Sparks | ....................... 385/127 |

2005/0185885 A1  8/2005  Onaka et al.

FOREIGN PATENT DOCUMENTS

| JP | 3-233411 A | 10/1991 |
| JP | 2980248 B2 | 9/1999 |
| JP | 2005-241712 A | 9/2005 |
| WO | 97/21124 A1 | 6/1997 |

* cited by examiner

*Primary Examiner*—Daniel Petkovsek
(74) *Attorney, Agent, or Firm*—Westerman, Hattori, Daniels & Adrian, LLP

(57) ABSTRACT

A multi-mode optical coupler which includes an integrated section in which two optical fibers are fused and integrated together, at least one of these optical fibers being a multi-mode fiber, the multi-mode optical coupler coupling multi-mode light carried in the one of the multi-mode fibers to the other of the optical fibers, wherein: assuming that an outline of the integrated section in a plane view of the optical coupler is a function of a position along the longitudinal direction of the fibers, the multi-mode optical coupler has a plurality of inflection points along the outline; the multi-mode optical coupler satisfies: in an area between the farthermost inflection points includes: the length of the area between the inflection points is not more than 2 mm and an outer diameter h2 of the optical fibers along the direction in which the optical fibers are arranged in parallel is in the range of 70% to 80% of a sum of the outer diameters of the optical fibers; or the length of the area between the inflection points is not less than 1 mm and not more than 2 mm and the outer diameter h2 is in the ranges of 50% to 70% and 80% to 90% of the sum of the outer diameters of the optical fibers.

2 Claims, 6 Drawing Sheets

MULTI-MODE OPTICAL COUPLER

BACKGROUND OF THE INVENTION

1. Field of the Invention

The present invention relates to an optical fiber coupler used for optical communication, especially for fields of a short-distance transmission system and a fiber laser. The invention also relates to a multi-mode optical coupler with an integrated section of which configuration is controlled with parameters so as to optimize coupling efficiency of multi-mode light.

Priority is claimed on Japanese Patent Application No. 2007-299600, filed Nov. 19, 2007, the content of which is incorporated herein by reference.

2. Background Art

Optical fiber couplers (referred herein as "coupler") are classified roughly into two groups as to their structures: couplers manufactured by heating two fibers arranged in parallel to fuse and integrate together so that light from one of the fibers is coupled laterally to the other (such pumping is called "side pumping"); and bundle couplers in which multiple fibers are bundled together so that light is coupled through ends of the fibers (such pumping is called "end surface pumping").

These couplers are manufactured by, for example, heating multiple fibers to fuse and integrate together and then stretching the fibers to obtain couplers with a diameter-reduced integrated section. Couplers manufactured in this process are called fused fiber couplers.

The fused fiber couplers have often been used for optical communication, and are usually combined with single-mode fibers. Various couplers, such as a TAP coupler, a 3 dB coupler and a WDM coupler, are in practical use.

The coupler according to an aspect of the invention is a multi-mode optical coupler for coupling multi-mode fibers rather than single-mode fibers.

In general, multi-mode optical coupling is often used for supplying pumping light to a rare earth doped fiber in an optical amplifier (including laser). The multi-mode optical coupler according to an aspect of the invention is also suitably used for pumping light coupling in an optical amplifier.

Couplers used for coupling multi-mode light have been proposed in, for example, Japanese Patent No. 2980248, Published Japanese Translation No. 2000-502193 of the PCT International Publication and Japanese Unexamined Patent Application, First Publication No. 2005-241712.

Among these couplers, one disclosed in Japanese Patent No. 2980248 is simple in structure, easy to manufacture and stable to heat and vibration. In the structure of the coupler disclosed in Japanese Patent No. 2980248, however, coupling efficiency to a multi-mode fiber is determined depending substantially on a cross-sectional ratio of each fiber. For example, in a combination of one multi-mode fiber and one single-mode fiber which used as multi-mode fiber disclosed in Japanese Patent No. 2980248, coupling efficiency to the multi-mode fiber is 1/(1+1)=50%. In a combination of two multi-mode fibers and one single-mode fiber, coupling efficiency to the multi-mode fibers may be as low as about 1/(2+1)=33%.

In order to address such low coupling efficiency, a core of the single-mode fiber may be doped with a rare earth element for temporarily absorbing pumping light. In this case, the light coupled to the single-mode fiber is absorbed by the core and is thus lost. As a result, a larger amount of light carried in a multi-mode fiber becomes coupled to the cladding of single-mode fiber, and thus the coupling efficiency eventually exceeds 50%.

However, light is absorbed by the core typically slowly, and thus in order to improve coupling efficiency in the above-described manner, the portion where the fibers are twisted and integrated together becomes significantly elongated.

In the disclosure of Japanese Patent No. 2980248, it is not clear whether the light is coupled to the core or the clad of the single-mode fiber. But coupling to the clad would seem to be a natural interpretation and an integrated length required therefor will be estimated below. Under the circumstance described above, the single-mode fiber in Japanese Patent No. 2980248 may be considered as a double-clad fiber.

The light absorptivity of the core itself is assumed to be 500 dB/m. Since the light is spread out into the entire fiber, the amount of light effectually absorbed by the core becomes smaller depending on the cross-sectional ratio of core with respect to the entire fiber. The core diameter is usually about 10 μm and an outer diameter of the fiber is usually not less than 100 μm, which means that the cross-sectional ratio is up to 0.01. In this case, the effectual absorptivity is up to 5 dB/m. Accordingly, the integrated fiber length required for absorbing 90% of light in the single-mode fiber is at least 2 m. The coupling efficiency herein with the combination of one multi-mode fiber and one single-mode fiber is 75%.

As described above, if the light carried in the multi-mode fiber is to be coupled to a single-mode fiber with the coupling efficiency of not less than 50% in the process disclosed in Japanese Patent No. 2980248, a length of several meters will be required for the coupling. It is thus difficult to integrate the fibers and is thus not useful.

Disclosed in Published Japanese Translation No. 2000-502193 of the PCT International Publication and Japanese Unexamined Patent Application, First Publication No. 2005-241712 is another method for coupling light between a light carried in a fiber and a light laterally injected the fiber using space coupling. Such a method requires a complicated structure and has varying coupling efficiency depending on misalignment. Accordingly, there has been a problem that reliability may vary significantly due to environmental conditions, such as a temperature change, vibration and impact.

SUMMARY OF THE INVENTION

The invention has been devised in view of the aforementioned circumstances. An object of the invention is to provide a multi-mode optical coupler with which sufficient amount of light is coupled in a short coupling distance and with a simple structure.

In order to solve the aforementioned problems and to achieve the object, the followings are employed in the invention.

(1) A multi-mode optical coupler according to an aspect of the invention includes an integrated section in which two optical fibers are fused and integrated together, at least one of these optical fibers being a multi-mode fiber, the multi-mode optical coupler coupling multi-mode light cried in the one of the multi-mode fibers to the other of the optical fibers, wherein: assuming that an outline of the integrated section in a plane view of the optical coupler is a function of a position along the longitudinal direction of the fibers, the multi-mode optical coupler has a plurality of inflection points along the outline; the multi-mode optical coupler satisfies: in an area between the farthermost two inflection points: the length of the area between the inflection points is not more than 2 mm and an outer diameter h2 of the optical fibers along the direction in which the optical fibers are arranged in parallel is in the range of 70% to 80% of a sum of the outer diameters of the optical fibers; or the length of the area between the inflection points is not less than 1 mm and not more than 2 mm and the outer diameter h2 is in the ranges of 50% to 70% and 80% to 90% of the sum of the outer diameters of the optical fibers.

According to the multi-mode optical coupler as described in above (1), multi-mode light carried in the multi-mode fiber can be coupled to another optical fiber, such as a double-clad fiber, with a high coupling efficiency in a simple structure.

The multi-mode optical coupler can be manufactured by partially fusing two optical fibers and integrating the same such that the length of the area between two inflection points, among a plurality of inflection points provided along the outline of the integrated section, is not more than 2 mm. With this configuration, the two optical fibers can be integrated easily, and the multi-mode optical coupler can be made compact and is thus useful.

(2) Preferably, one of the optical fibers is a multi-mode fiber and the other is a double-clad fiber. The multi-mode light carried in the multi-mode fiber is preferably coupled to a first clad of the double-clad fiber. (The second clad of the double-clad fiber is removed in the integrated section of coupler.)

PREFERRED EMBODIMENT

Figure 1A:
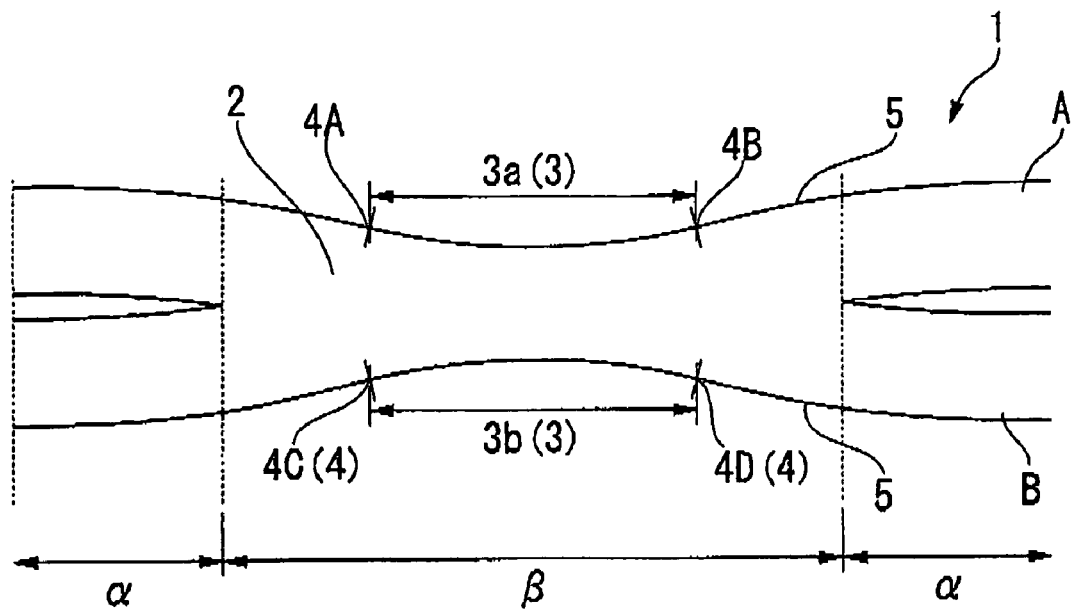
FIG. 1A is a plane view schematically showing an embodiment of a multi-mode optical coupler according to the invention shown in a laid flat position.

Referring now to the drawings, an embodiment of the invention will be described.

Figure 1B:
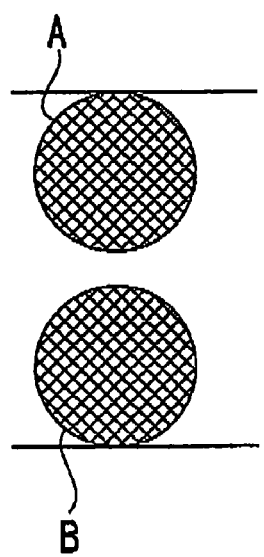
FIG. 1B is a cross-sectional view of an area a shown in FIG. 1A.
Figure 1C:
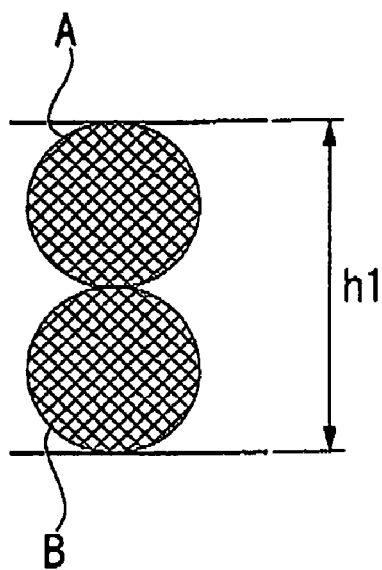
FIG. 1C is a cross-sectional view taken along a boundary of the area α and an area β shown in FIG. 1A.
Figure 1D:
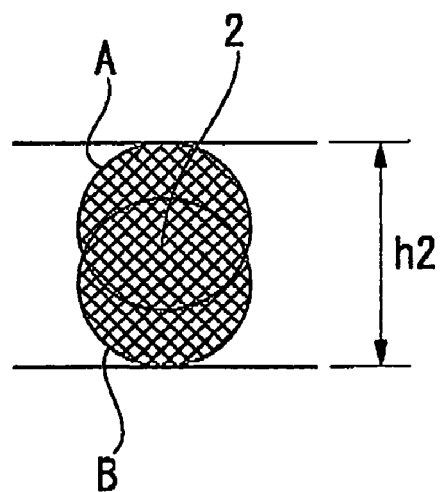
FIG. 1D is a cross-sectional view of an area between inflection points shown in FIG. 1A.

FIGS. 1A to 1D show an embodiment of a multi-mode optical coupler according to the invention. FIG. 1A is a plane view of a multi-mode optical coupler 1 shown in a laid flat position. The multi-mode optical coupler 1 in FIG. 1A is shown not to scale. FIG. 1B is a cross-sectional view of the multi-mode optical coupler 1 at an area (i.e., area α) out of an integrated section 2 shown in FIG. 1A. FIG. 1C is a cross-sectional view of an end of the integrated section 2 (i.e., a boundary of the area α and an area β shown in FIG. 1A). FIG. 1D is a cross-sectional view of an area 3 between inflection points in the integrated sections 2 (i.e., the area β) in FIG. 1A. In FIGS. 1A to 1D, reference numeral 1 denotes a multi-mode optical coupler, numeral 2 denotes an integrated section, numeral 3 denotes an area between inflection points, numerals 4A to 4D each denote an inflection point, numeral 5 denotes an outline, and alphabet A and B each denote an optical fiber. At least one of optical fibers A and B is a multi-mode fiber. Reference numeral h1 in FIG. 1C represents a sum of outer diameters of the optical fibers A and B and h2 in FIG. 1D represents a sum of outer diameters of the optical fibers in the area 3 between the inflection points where the optical fibers are fused and integrated together. Reference numerals h1 and h2 both represent the outer diameters of the fibers A and B which are arranged in parallel.

The multi-mode optical coupler 1 according to the present embodiment includes the integrated section 2 in which two optical fibers A and B are fused and integrated together. One of these optical fibers, namely the optical fiber A, is a multi-mode fiber. The multi-mode optical coupler 1 is for coupling multi-mode light carried in the multi-mode fiber A to the glass in the other of the optical fibers, namely the optical fiber B. Assuming that the outline 5 of the integrated section 2 in a plane view of the optical fiber is a function of a position along the longitudinal direction of the fibers, the multi-mode optical coupler 1 has a plurality of inflection points 4 along the outer frame line 5. In an area between the farthermost two inflection points 4: the length of the area 3 between the farthermost two inflection points 4A and 4B or 4C and 4D is not more than 2 mm and the outer diameter h2 of the optical fibers A and B along the direction in which these optical fibers are arranged in parallel is in the range of 70% to 80% of the sum of the outer diameters of these optical fibers; or the length of the area 3 between the inflection points is not less than 1 mm and not more than 2 mm and the outer diameter h2 of the optical fibers A and B along the direction in which these optical fibers are arranged in parallel is in the ranges of 50% to 70% and 80% to 90% of the sum of the outer diameters of these optical fibers.

The integrated section 2 is defined as a section where the two optical fibers A and B, which are partially fused and integrated together, are in physical contact with each other and fused together at their glass portions. In FIG. 1A, the two optical fibers A and B are fused and integrated together at the area β.

The outline 5 of the integrated section 2 is defined as a line that is recognized as an outline of the integrated section 2 and the vicinity thereof, seen in a plane view, of the multi-mode optical coupler 1 which is in a laid flat position as shown in FIG. 1A.

The inflection point 4 is defined as a point where secondary derivative of a function intersects with zero, assuming that the outline 5 of the integrated section 2 of the optical fiber is a function.

A plurality of inflection points 4 (4A, 4B, 4C, 4D) are provided along the outline 5 of the integrated section 2. The area 3 between the inflection points is an area defined between the farthermost infection points 4A and 4B or between the farthermost inflection points 4C and 4D. A cross-sectional area S of the optical fiber which is fused and integrated has the smallest cross-sectional area $S_{min}$ in the area 3 between the inflection points. A cross-section area $S_3$ of the area 3 between the inflection points is in the range of about $S_{min}+20\%$.

The outer diameter h2 of the integrated section 2 is defined as an outer diameter of the outer diameter of integrated section 2 along the direction in which the optical fiber A and the optical fiber B are arranged in parallel. For example, h2 in FIG. 1D corresponds to this outer diameter.

When the two optical fibers are heated, fused and then stretched, the outline 5 becomes a smooth curve (i.e., substantially S-shape) as shown in FIG. 1A. The inflection points 4 (i.e., the inflection points 4A and 4B or the inflection points 4C and 4D) exist at least both ends of an area where the cross-sectional areas of the fused and integrated optical fibers are smallest (i.e., the area having a cross-sectional area of in the range of about $S_{min}$+20%).

A larger number of the inflection points may be provided depending on manufacturing conditions. In that case, the distance between two points at both ends (i.e., the farthermost points) is defined as "the length of the area 3 between the inflection points" herein. The length of the area between the inflection points is not the length of the outline 5 of the multi-mode optical coupler but the length of linear distance between the farthermost points of the area between the inflection points.

Next, an exemplary process for determining the inflection points 4 of the manufactured multi-mode optical coupler 1 and determining the area 3 between the inflection points will be described.

(1) The manufactured multi-mode optical coupler 1 is laid flat and the vicinity of the integrated section 2 is photographed.

(2) The outline 5 of the photographed vicinity of the integrated section 2 is converted into discrete sequence of points using a computer (perpendicular coordinate axes and an origin coordinate may arbitrarily be defined on the photographed image).

(3) Secondly differentiation of the sequence of points is obtained (the obtained secondary differentiation also is a discrete sequence of points).

(4) The inflection points 4 are determined where the sequence of points of the secondary derivative obtained in step (3) change from positive (+) to negative (−). Among these obtained inflection points 4, the distance between the farthermost ends is defined as the length of the area 3 between the inflection points. If the positions of the inflection points 4 of the upper and lower fibers A and B differ from each other and thus the length of the areas 3a and 3b between the inflection points obtained in the upper and lower fibers A and B differ from each other, an average of the obtained length is defined as the length of the area 3 between the inflection points.

Positional accuracy of the inflection points 4 to be obtained is determined depending on the resolution of the sequence of points that is first taken from the photographed image. For example, when the used optical fiber has an outer diameter of 60 to 130 μm, the optical fiber is photographed at 200 to 800-fold magnifications in the direction perpendicular to the longitudinal direction of the fibers and at 1 to 20-fold magnification in the direction of the longitudinal direction of the fibers. The photographed image is then divided into about 1000 segments to obtain positions of the inflection points 4.

In step (2), various image processing devices can be used as a computer. A simple method may include processing using a personal computer with outline extraction software and image-text conversion software installed therein. The secondary derivative from the data about the outline 5 may be computed collectively using spreadsheet software.

In the multi-mode optical coupler according to the invention: the multi-mode optical coupler satisfies: the length of the area 3 between the inflection points is not more than 2 mm and the outer diameter h2 of the integral section 2 in the area 3 between the inflection points is in the range of 70% to 80% of the sum h1 of the outer diameters of these optical fibers; or the length of the area between the inflection points is not less than 1 nun and not more than 2 mm and the outer diameter h2 of the integrated section 2 in the area 3 between the inflection points is in the ranges of 50% to 70% and 80% to 90% of the sum of the outer diameters of these optical fibers.

Table 1 shows the coupling efficiency of couplers with varying length of the area 3 between the inflection points and the maximum outer diameter h2, manufactured using a multi-mode fiber and a double-clad fiber. The sum h1 of the outer diameters of the two optical fibers is 250 μm.

TABLE 1

| Length of area between inflection points (mm) | Maximum outer diameter of area between inflection points | | | | | |
|---|---|---|---|---|---|---|
| | 250 μm | 235 μm | 200 μm | 175 μm | 125 μm | 110 μm |
| 0 | 0.0% | 15% | 65% | 80% | 35% | 50% |
| 0.5 | 0.0% | 30% | 60% | 80% | 45% | 51% |
| 1 | 0.0% | 60% | 70% | 65% | 80% | 47% |
| 2 | 1.3% | 60% | 60% | 60% | 60% | 51% |
| 3 | 2.3% | 50% | 40% | 50% | 55% | 55% |
| 4 | 3.0% | 45% | 55% | 45% | 50% | 50% |
| 6 | 4.5% | 45% | 50% | 44% | 45% | 43% |

From the results shown in Table 1, it is found that the coupling efficiency of not less than 60% of the multi-mode optical coupler can be achieved when the following conditions are satisfied: the length of the area between the inflection points is not more than 2 mm and the outer diameter of the integral section in the area between the inflection points is in the range of 70% to 80% of the sum of the outer diameters of these optical fibers; or the length of the area between the inflection points is not less than 1 mm and not more than 2 mm and the outer diameter of the integrated section in the area between the inflection points is in the ranges of 50% to 70% and 80% to 90% of the sum of the outer diameters of these optical fibers. In Table 1, 0 mm of the length of the area between the inflection points indicates that the farthermost inflection points are extremely close to each other (i.e., the length of the area between the inflection points is about 200 μm to 400 μm, for example).

Preferred conditions under which the coupling efficiency becomes the highest exist in a further limited range. For example, as shown in Table 1, the length of the area 3 between the inflection points at which the highest coupling efficiency is obtained varies depending on the maximum outer diameter of the area 3 between inflection points. The results shown in Table 1 are just for illustrative case, and other combinations of the maximum outer diameter of the area 3 between inflection points at which the highest coupling efficiency is obtained and the length may exist depending on, for example, the number of openings for light carried in the multi-mode fiber.

However, any of the combinations require the following conditions: the length of the area 3 between the inflection points is not more than 2 mm and the outer diameter h2 of the integral section 2 in the area 3 between the inflection points is in the range of 70% to 80% of the sum h1 of the outer diameters of these optical fibers; or the length of the area between the inflection points is not less than 1 mm and not more than 2 nm and the outer diameter h2 of the integrated section 2 in the area 3 between the inflection points is in the ranges of 50% to 70% and 80% to 90% of the sum of the outer diameters of these optical fibers.

In the multi-mode optical coupler according to the invention, it suffices that at least one of the two optical fibers A and B is a multi-mode fiber and the other of the fibers, namely the optical fiber B, is not particularly limited. The optical fiber B may be, for example, a single-mode fiber, a multi-mode fiber and a double-clad fiber, which may be used in suitable combination.

The outer diameters (for a fiber with resin coating or resin clad, the outer diameter of exposed silica glass with resin removed) of the two optical fibers A and B are not limited to typical 125 μm, but fibers of various outer diameters can be employed. The two optical fibers A and B may have the same or different outer diameters.

Figure 5:
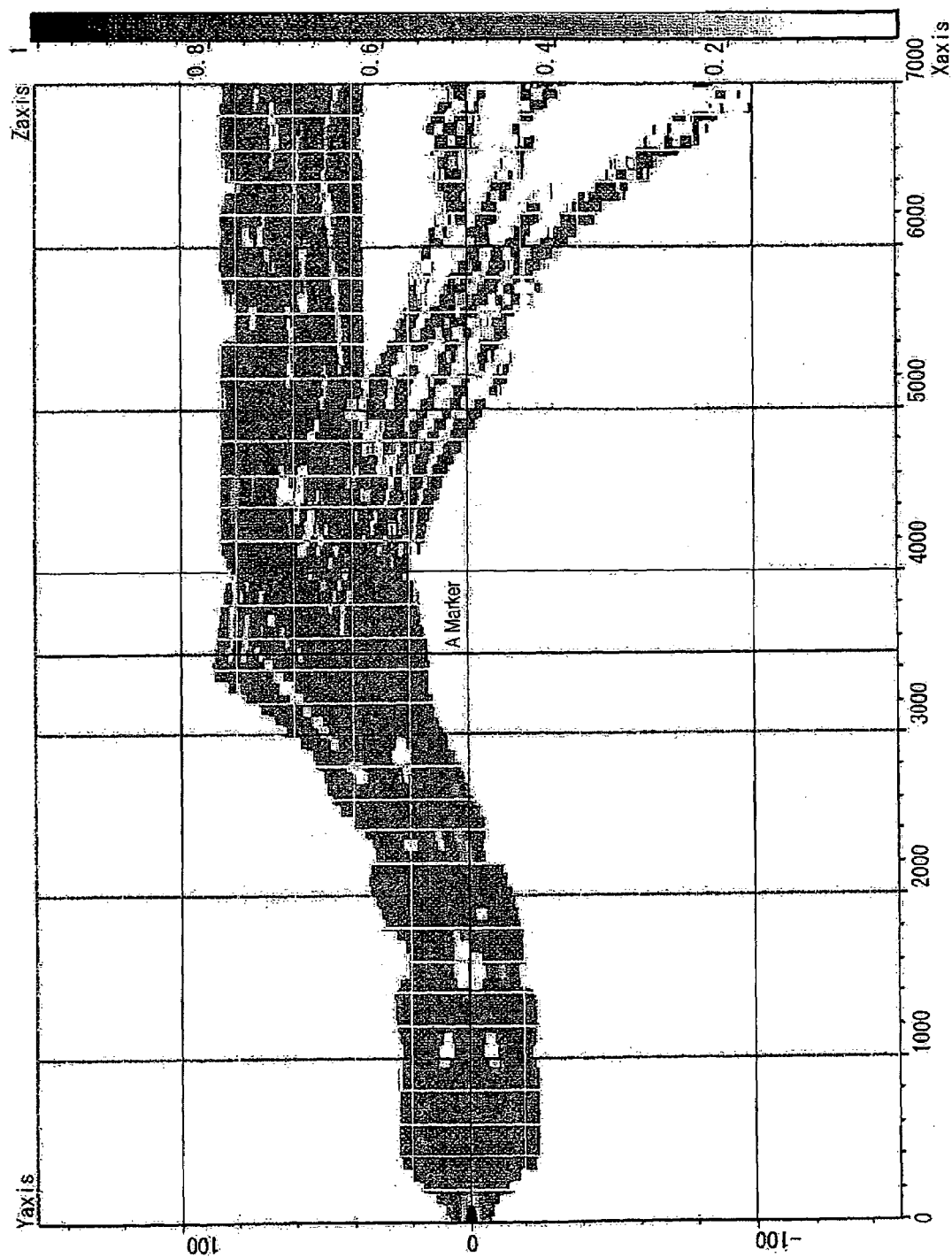
FIG. 5A shows a calculation result of estimated electric field distribution using beam propagation in which two optical fibers are fused and integrated together.
FIG. 5B shows a calculation result of estimated electric field distribution using beam propagation in which two optical fibers are fused and integrated together.
Figure 5:
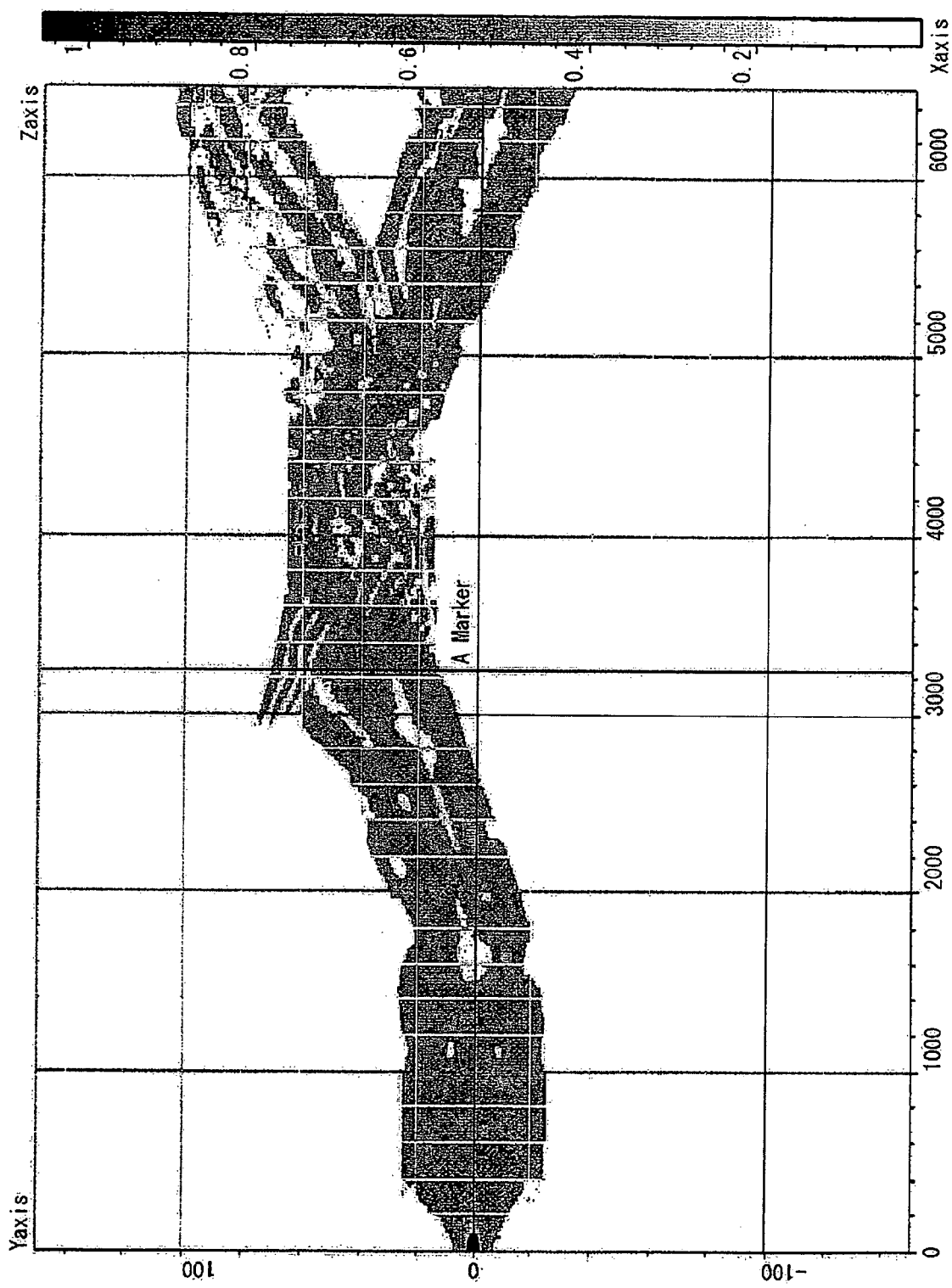

FIGS. 5A and 5B show calculation results of estimated electric field distribution using beam propagation in which two optical fibers are fused and integrated together. In both FIGS. 5A and 5B, the used optical fibers have an outer diameter of 50 μm at glass portions to be fused and integrated together. In FIG. 5A, the length of the area between the infection points is 1.5 mm and the outer diameter of the integrated section at the area between the inflection points is 80 μm (which is equivalent to 80% of the sum of the outer diameters of the two optical fibers). In FIG. 5B, the length of the area between the inflection points is 3 mm and the outer diameter of the integrated section at the area between the inflection points is 50 μm (which is equivalent to 50% of the sum of the outer diameters of the two optical fibers). The optical coupling efficiency obtained in FIG. 5A is 80% and the optical coupling efficiency obtained in FIG. 5B is 20%.

As described above, it is found that the coupling efficiency of not less than 60% of the multi-mode optical coupler can be achieved when the following conditions are satisfied: the length of the area 3 between the inflection points is not more than 2 mm and the outer diameter h2 of the integral section 2 in the area 3 between the inflection points is in the range of 70% to 80% of the sum h1 of the outer diameters of these optical fibers; or the length of the area between the inflection points is not less than 1 mm and not more than 2 mm and the outer diameter h2 of the integrated section 2 in the area 3 between the inflection points is in the ranges of 50% to 70% and 80% to 90% of the sum of the outer diameters of these optical fibers.

EXAMPLES

Example 1

A method of manufacturing the multi-mode optical coupler shown in FIG. 1A and the obtained result will be described below. The following fibers A and B were used.

Fiber A: a resin-clad multi-mode fiber (clad diameter: 200 μm, core diameter: 125 μm)

Fiber B: a double-clad fiber having resin as a second clad (second clad diameter: 200 μm, first clad diameter: 125 μm, core diameter: 10 μm)

First, resin portions of these fibers were removed (an outer diameter of a glass portion of each fiber was 125 μm and a sum of the outer diameters was 250 μm). Then, two fibers were twisted together twice and arranged such that the glass portions thereof were in contact with each other. The fibers were heated by acid hydrogen flame so as to fuse and integrate together. Then, the fibers were continuously heated while being slightly stretched. Heating was stopped when the diameter of the central part of the integrated section was about 125 μm and the length was about 1.5 mm.

Figure 2:
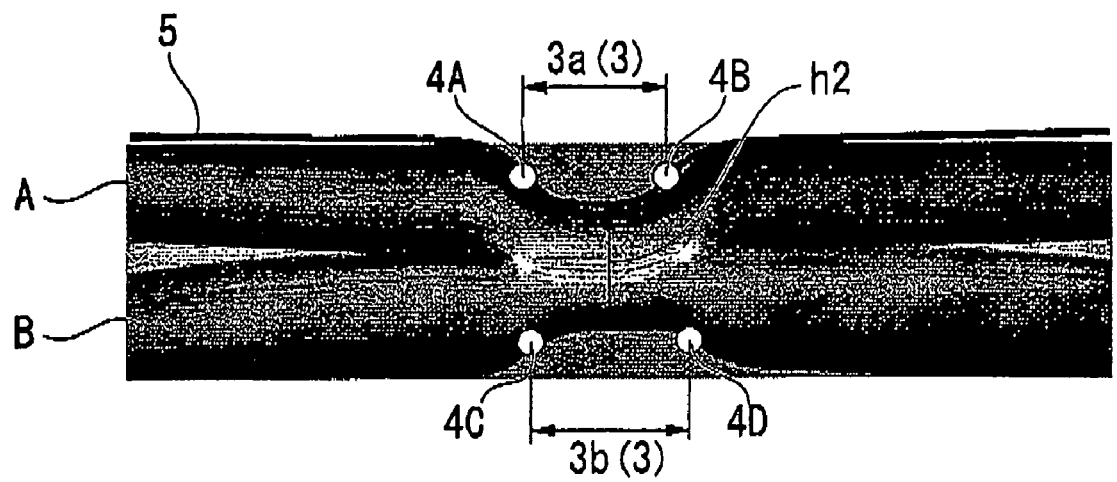
FIG. 2 is a plane view of a main part of a multi-mode optical coupler manufactured in Example 1.

FIG. 2 shows an integrated section in which two fibers A and B are heated to fuse and integrate together. The integrated section in FIG. 2 is shown not to scale.

In the obtained multi-mode optical coupler of Example 1, a vicinity of the integrated section was photographed as shown in FIG. 2 as a plane view so as to determine the inflection points 4A to 4D according to the above-described determination steps (1) to (4). A measured distance of an area 3a between the inflection points (3) between upper two inflection points 4A and 4B was 1.5 mm in FIG. 2. A measured distance of an area 3b between the inflection points (3) between lower two inflection points 4C and 4D was 1.6 mm.

The outer diameter of the integrated section in the areas 3a and 3b between the inflection points was 125 μm along the direction in which the two optical fibers are arranged in parallel.

The coupling efficiency of the obtained coupler was 63.1%.

Comparative Example

For comparison, a coupler having an area between the inflection points which is longer than that of the coupler according to the invention was manufactured.

The same two fibers were used as in Example 1. These fibers were twisted together twice and arranged such that the glass portions thereof were in contact with each other. The fibers were heated by acid hydrogen flame so as to fuse and integrate together. Then, the fibers were continuously heated while being slightly stretched. Heating was stopped when the diameter of the central part of the integrated section was about 125 μm and the length was about 4 mm.

Figure 3:
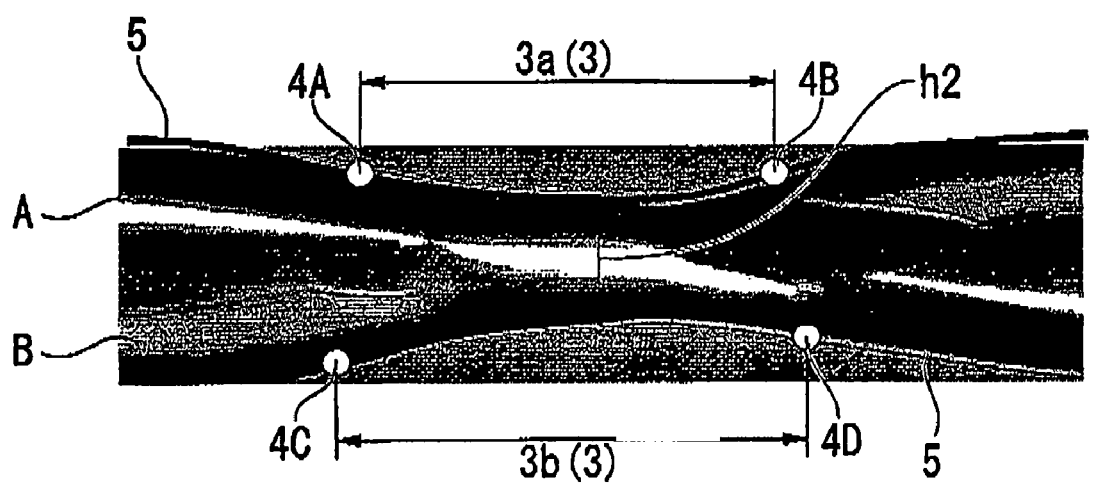
FIG. 3 is a plane view of a main part of a multi-mode optical coupler manufactured in Comparative Example.

An integrated section of the coupler obtained in Comparative Example is shown in FIG. 3. The integrated section in FIG. 3 is shown not to scale.

In the obtained multi-mode optical coupler of Comparative Example, the inflection points 4A to 4D were determined in the same manner as in Example 1. A measured distance of an area 3a between the inflection points (3) between upper two inflection points 4A and 4B was 3.8 mm in FIG. 3. A measured distance of an area 3b between the inflection points (3) between lower two inflection points 4C and 4D was 4.2 mm.

The outer diameter of the integrated section in the areas 3a and 3b between the inflection points was 125 μm along the direction in which the two optical fibers are arranged in parallel.

The coupling efficiency of the obtained coupler was 49.1%, which was lower than that of Example 1.

Example 2

Figure 4:
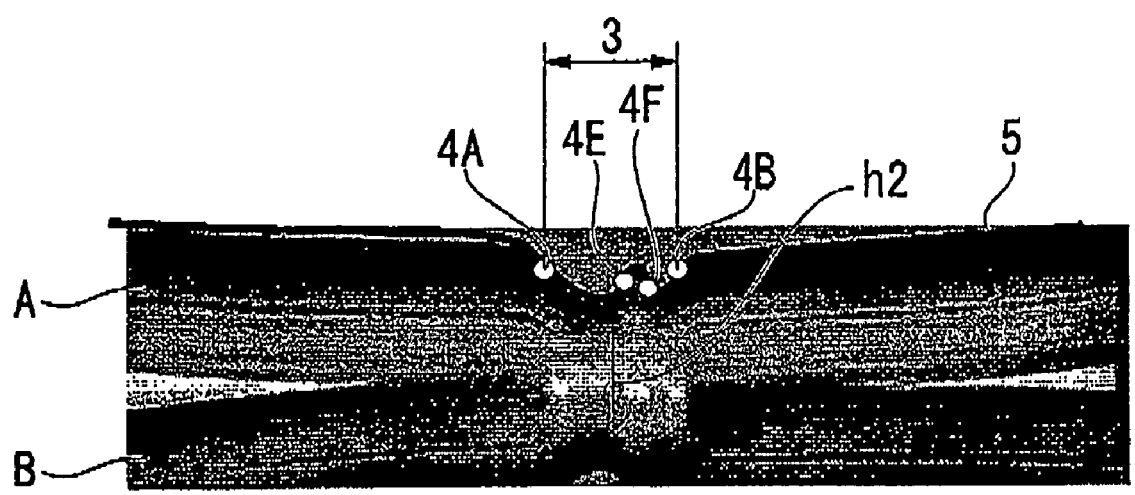
FIG. 4 is a plane view of a main part of a multi-mode optical coupler manufacture in Example 2.

A multi-mode optical coupler of Example 2 was manufactured in the same manner as in Example 1 except that the two fibers A and B are heated for fusing and stretching such that a protrusion is formed as shown in FIG. 4. The integrated section in FIG. 4 is shown not to scale. Heating was stopped when the diameter of the central part of the integrated section was about 125 μm and the length was about 1.5 mm. In this manner, the multi-mode optical coupler according to Example 2 was obtained.

Four inflection points (4A, 4B, 4E and 4F) existed on the outline 5 (i.e., the upper outline) in the integrated section of the manufactured coupler. Among these inflection points, an area between the furthermost two inflection points 4A and 4B was defined as an area 3 between inflection points. The length of the area 3 between the two inflection points was 1.5 mm. The coupler of Example 2 had the almost same coupling efficiency as in Example 1.

While preferred embodiments of the invention have been described above, the invention is not limited thereto. Additions, omissions, substitutions and other modifications can be made to the structure without departing from the spirit or scope of the invention. Accordingly, the invention is not to be considered as being limited by the foregoing description, and is only limited by the scope of the appended claims.

What is claimed is:

1. A multi-mode optical coupler which includes an integrated section in which two optical fibers are fused and integrated together, at least one of these optical fibers being a multi-mode fiber, the multi-mode optical coupler coupling multi-mode light carried in the one of the multi-mode fibers to the other of the optical fibers, wherein:

assuming that an outline of the integrated section in a plane view of the optical coupler is a function of a position along the longitudinal direction of the fibers, the multi-mode optical coupler has a plurality of inflection points along the outline;

the multi-mode optical coupler satisfies:

in an area between the farthermost inflection points includes: the length of the area between the inflection points is not more than 2 mm and an outer diameter $h2$ of the optical fibers along the direction in which the optical fibers are arranged in parallel is in the range of 70% to 80% of a sum of the outer diameters of the optical fibers; or the length of the area between the inflection points is not less than 1 mm and not more than 2 mm and the outer diameter $h2$ is in the ranges of 50% to 70% and 80% to 90% of the sum of the outer diameters of the optical fibers.

2. The multi-mode optical coupler according to claim 1, wherein:

the other of the optical fibers is a double-clad fiber; and multi-mode light carried in the multi-mode fiber is coupled to a first clad of the double-clad fiber.

* * * * *